(12) United States Patent
Winkelmann

(10) Patent No.: US 9,458,326 B2
(45) Date of Patent: *Oct. 4, 2016

(54) POLYMER MATERIALS COMPRISING COUPLED COMPONENTS

(76) Inventor: Felix Winkelmann, Bonn (DE)

(*) Notice: Subject to any disclaimer, the term of this patent is extended or adjusted under 35 U.S.C. 154(b) by 1014 days.

This patent is subject to a terminal disclaimer.

(21) Appl. No.: 13/395,246

(22) PCT Filed: Sep. 9, 2010

(86) PCT No.: PCT/DE2010/001061
§ 371 (c)(1),
(2), (4) Date: May 22, 2012

(87) PCT Pub. No.: WO2011/029433
PCT Pub. Date: Mar. 17, 2011

(65) Prior Publication Data
US 2012/0238651 A1    Sep. 20, 2012

(30) Foreign Application Priority Data

Sep. 9, 2009   (DE) .................. 10 2009 040 637
Sep. 9, 2009   (DE) .................. 10 2009 040 638

(51) Int. Cl.
*C09C 3/12*    (2006.01)

(52) U.S. Cl.
CPC ..................... *C09C 3/12* (2013.01)

(58) Field of Classification Search
CPC combination set(s) only.
See application file for complete search history.

(56) References Cited

U.S. PATENT DOCUMENTS

| | | | |
|---|---|---|---|
| 4,349,605 A | | 9/1982 | Biggs et al. |
| 5,100,929 A | | 3/1992 | Jochum et al. |
| 5,256,706 A | * | 10/1993 | Carpenter et al. ............ 523/213 |
| 5,910,523 A | * | 6/1999 | Hudson ......................... 523/213 |
| 6,916,536 B1 | | 7/2005 | Hammen et al. |
| 8,343,270 B2 | * | 1/2013 | Jennrich et al. ......... 106/287.35 |
| 2003/0149154 A1 | * | 8/2003 | Heinemann et al. ......... 524/442 |
| 2003/0212180 A1 | | 11/2003 | Rietz et al. |
| 2004/0180193 A1 | * | 9/2004 | Oda et al. ..................... 428/328 |
| 2007/0010600 A1 | * | 1/2007 | Goodman et al. ............ 523/216 |
| 2007/0088095 A1 | | 4/2007 | Tamaki et al. |
| 2008/0033071 A1 | | 2/2008 | Irmer et al. |
| 2008/0145545 A1 | | 6/2008 | Chisholm et al. |
| 2009/0298991 A1 | * | 12/2009 | Kwon et al. .................. 524/443 |
| 2012/0135216 A1 | * | 5/2012 | Kwon et al. .................. 428/220 |
| 2014/0080938 A1 | * | 3/2014 | Winkelmann ................ 522/113 |

FOREIGN PATENT DOCUMENTS

| | | |
|---|---|---|
| AT | 284462 | 1/1970 |
| DE | 2 139 977 | 2/1972 |
| DE | 2 060 665 | 3/1972 |
| DE | 31 35 749 C2 | 5/1982 |
| DE | 195 19 212 C2 | 11/1996 |
| DE | 100 29 103 A1 | 1/2002 |
| DE | 102 38 369 A1 | 3/2004 |
| DE | 102 54 808 A1 | 6/2004 |
| DE | 10 2004 002 178 A1 | 8/2005 |
| DE | 20 2005 014 332 U1 | 2/2006 |
| DE | 10 2004 036 573 A1 | 3/2006 |
| DE | 699 27 758 T2 | 4/2006 |
| DE | 10 2007 021 199 A1 | 1/2008 |
| DE | 10 2007 042 496 A1 | 5/2008 |
| DE | 10 2006 061 057 A1 | 6/2008 |
| EP | 0 117 998 A1 | 9/1984 |
| EP | 1 054 035 A2 | 11/2000 |
| EP | 1 060 211 B1 | 4/2003 |
| EP | 1 340 788 A2 | 9/2003 |
| EP | 1 630 206 A2 | 3/2006 |
| FR | 2 582 005 A1 | 11/1986 |
| GB | 1 300 640 | 12/1972 |
| GB | 2 177 093 A | 1/1987 |
| WO | 93 11190 A1 | 6/1993 |
| WO | 00 68321 A1 | 11/2000 |
| WO | 01 96459 A1 | 12/2001 |
| WO | 2007 047294 A2 | 4/2007 |

* cited by examiner

*Primary Examiner* — Sanza McClendon
(74) *Attorney, Agent, or Firm* — Hudak, Shunk & Farine Co. LPA

(57) ABSTRACT

Disclosed are intermediate products (semifinished products) for polymer materials, comprising surface-modified components, said polymer materials based on the intermediate products, a method for producing the intermediate products, and the use thereof.

11 Claims, No Drawings

POLYMER MATERIALS COMPRISING COUPLED COMPONENTS

FIELD OF THE INVENTION

The invention relates to intermediates (semifinished products) for polymeric materials with surface-modified filler components, the polymeric materials on the basis of the intermediates, a process for their preparation of the intermediates and their use.

In the plastics industry it is a common procedure to improve the characteristic profiles of the known polymers by blending (compounding) of additives such as fillers and additives.

BACKGROUND OF THE INVENTION

Important common fillers are chalk, sand, diatomaceous earth, glass fibers and spheres, zinc, wood flour, wood fibers, cellulose fibers, textile fibers, starch, graphite, carbon black and talc, mica (muscovite, phlogopite, sericite) aluminosilicates, clays (e. g. montmorillonite) carbon fibers, glass flakes, aluminum hydroxide (ATH), magnesium hydroxide (MDH), metal oxides such as aluminum oxide, titanium dioxide, calcium carbonate (GCC, PCC, marble), gypsum, wollastonite, basalt fibers, rock wool fibers, quartz powder, fused silica, micro silica or feldspar. This is only an exemplary list of possible components.

From EP 1 340 788 A2 for example, is the preparation of a compound known based on a thermoplastic material. As will be described in this document, are thermoplastics, for example polyvinyl chloride, with a crosslinking agent, a stabilizer, chalk as a filler and a alkylbenzophenone processed as a radical initiator to a workable compound. After molding, here extrusion, is the polymer crosslinked by irradiation with UV light. The fillers are here merely physically incorporated into the thermoplastic and have a filling function.

SUMMARY OF THE INVENTION

Object of the present invention is the use of mineral components as building blocks of synthetic polymers (compounds) for example, increase the mechanical stability, tensile strength, impact strength, scratch resistance and elastic modulus.

Novel intermediates for polymeric materials with mineral components, a free radical initiator and optionally other additives were found, characterized in that the free radical initiator covered the surface of the surface-modified silicate component and the polymer chains are bonded at the surface of the modified silicate component.

In comparison to per se known polymer compounds are in the new compounds based on the novel intermediate products, the mineral components with the polymer chemically crosslinked and not as a filler only physically incorporated. Unlike other cross-linked thermoplastics, cross-linking is in priority to the mineral surface, while the rest of the thermoplastic component is substantially uncrosslinked further present and thus a thermoplastic processing is accessible.

According to the present invention, the new compounds exhibit enhanced chemical and mechanical stability, such as the strength or the tensile strength and impact strength or the elastic modulus as compared to compounds with incorporated mineral components or only coupling agents on surface-modified mineral fillers.

With the novel intermediates according to the invention, a new class of polymeric composite materials is ventured (polymer compounds).

These mineral components are characterized in that they have surface hydroxyl groups, which are accessible to a silane coupling reaction.

Mineral components for polymeric materials in the context of the present invention are silicates containing materials, respectively silicate structures containing materials, or metal oxides respectively oxide structures containing materials or metal hydroxides respectively hydroxide structures containing materials.

Mineral components in the context of the present invention can be, for example: silicates: natural and synthetic silicates, pyrogene and precipitated silicas, so-called island-silicates, chain silicates, band-silicates, network layer silicates or alumosilicates, minerals of the quartz group (quartz, quartz glass, fused silica, cristobalite), zeolites, feldspars, calcium silicate minerals or calcium-silikathydrate phases minerals (e.g. tobermorite or xonotlite) or metal oxides: natural or synthetic metal oxides such as alumina, silica, magnesium oxide, calcium oxide, titanium dioxide, iron oxides, zinc oxide.

Preferably in the context of the present invention, the mineral component consist of silicate and/or alumosilicates and/or siliconoxide and/or aluminumoxide materials or titanium dioxides.

For example, the following silicate materials are: mica, talc, wollastonite, asbestos, quartz, fused silica, silica glass, micro silica, kaolin, calcined kaolin, xonotlite, tobermorite, nepheline syenite, aluminum oxide, titanium dioxide.

In the context of the present invention, the mineral component can appear in granular form. In a preferred embodiment of the present invention is the mineral component present in finely divided form.

It is preferable that the mineral component is present in a grain size of less than 4 mm.

In particular, it is preferred here that the silicate component present in a grain size of 5 nm is to 250 microns.

The novel intermediates according to the invention are covered on the surface of the mineral component in a largely mono-molecular layer, or at least covered in submonolayer.

The radical former is attached on the organo-functional group which is remote to the surface. Afterwards the polymer is applied to the particle surface, so that virtually a multi-layered structure is constructed.

A multi-layer coverage (multilayers) is also possible.

In the case that is desired in the context of the invention that the mineral component is not linked completely with the polymer, of course, a partial cover is also possible (submonolayer).

For the novel intermediates according to the invention, it is particularly preferred if the greatest possible reaction of bifunctional silanes with the free hydroxyl groups of the mineral component has taken place and a covering as complete as possible of silanes modified mineral component with the radical former has taken place. Of course, the silane component can be present on the surface of the mineral component as a mixture with the free-radical former. Stratified on this is the thermoplastic phase.

Radical former in the context of the present invention are known per se.

Radical former in the context of the present invention can be: photoinitiators, photosensitizers or crosslinking agent. It can also be functional silanes or siloxanes with functional groups which break down under energetic impact in free radicals and/or initiate a crosslinking reaction.

Preferred free radical in the context of the present invention can be: photoinitiators: benzoin ethers, benzil, benzil ketals, alpha-splitter such as alpha, alpha-diethoxyacetophenone, alpha-hydroxyalkylphenones, alpha-aminoalkylphenones, aromatic ketone, systems of coinitiators: benzophenones and substituted benzophenones, Mischlers-ketone, photosensitizers: aromatic haloketones: phenacylchloride, desylchloride or 4-Chlormethylbenzophenone crosslinking agents: trimethylole-propane-trimethacrylate (TRIM) or tri-allyl-cyanurate (TAC), triallylisocyanurte (TAIC).

In the context of the present invention, polymers are attached to the surface of the coupling agent modified mineral component and then cross-linked with it.

Polymers in the context of the present invention are unsaturated, unbranched or branched, grafted or ungrafted thermoplastics and thermoplastic elastomers. They can be provided by addition reactions or by grafting with reactive groups.

For example, the following polymers are: polyethylene, polypropylene or mixtures of polyethylene and polypropylene (for example grafted and ungrafted), polyamide, polyurethane.

Polyvinylchloride (PVC), polycarbonate (PC), PMMA, polyaryle-etherketones (for example PEEK), polyoxymethylene (POM), polystyrenes (PS), polyimides, thermoplastic elastomers and natural polymers. This is only a selection of generally usable thermoplastics.

In the context of the present invention it is possible that the inventive intermediates contain additional known admixtures.

Admixtures (additives) are for example: flame retardants such as aluminum-trihydroxide (ATH) or magnesium hydroxide (MDH), stabilizers such as metal soaps and organo-tin compounds. Plasticizers such as substituted phthalates (e.g. dibutyl-phthalate), lubricants such as paraffins or UV stabilizing agents or fillers such as marble flour or silicates.

Coupling agents in the context of the present invention act as a linking or grafting spot (point) between mineral surface and the polymer.

Coupling agents are known per se. Examples are silanes, such as H-silanes and siloxanes, such as bifunctional silanes respectively partially condensed silanes or functional siloxanes, also other organo-metal alkoxides can be used.

For example, the following coupling agents can be: organo-silanes (eg. AMEO®) respectively Organo-siloxanes, titanates, organo zirconates, maleic anhydride grafted polyethylene or other MSA, Ca-stearate, fatty acids.

In particular, preferred as coupling agent are: amino silanes or functional silanes with amino groups, vinyl silanes, acrylic silanes, methacryloylsilanes, or octylsilanes epoxysilanes.

It also has been found a process for producing the intermediates for polymeric materials with surface-modified mineral components, which is characterized in that the radical initiator is distributed on the surface-modified mineral component, the polymer is added and the crosslinking is initiated by energetic impact.

The radical initiator can be in very finely divided solid, liquid state or in solution with the mineral component mixed and distributed on the surface.

It is generally preferred to distribute the radical initiator uniformly on the mineral component.

For the present method according to the invention is preferable to dissolve the radical initiator in a solvent and to distribute on the mineral component.

Suitable solvents for the solution of the radical initiators are for example: alcohols, halogenated organic solvents, silanes.

Preferred solvents are for example:

Methanole, methylene chloride, ethanol, isopropanol, acetone, organosilanes such as aminosilanes or octylsilanes or other bi- or multi-functional silanes.

Of course it is also possible to use mixtures of the solvents.

A preferred embodiment of the inventive method is characterized in that the mineral component and the radical initiator in a mass ratio less than 5%, preferably in a ratio of less than 2% by weight is used, in relation to the mass of the mineral component.

In a preferred embodiment of the method according to the invention is the mineral component present in finely divided form. It is preferable that the mineral component in a particle size of less than 4 mm is present.

In particular, it is preferred that the mineral component is present in a grain size of 5 nm to 250 microns.

In a preferred embodiment of the present invention, the thermoplastic is used in solution.

For the inventive method, it is preferred to dissolve the thermoplastic in a solvent and distribute on the filler, which is a coupling agent surface-modified mineral component and coated with radical initiator.

Suitable solvents for the solution of thermoplastics are for example: dichloromethane, butanone, tetrahydrofuran, chloroform, benzene, m-cresole, toluene, trichlorethylene, cyclohexanone, methyl ethyl ketone, acetone, dimethylformamide, ethyl acetate, methanol, ethanol or cyclohexane. The choice of solvent depends on the polymer to be dissolved.

Preferred solvents for polyamide are: toluene, m-cresol, Cyclohexanone, methyl-ethyl-ketone.

In particular, toluene and m-cresol are preferred as a solvent for polyamide.

Of course it is also possible to use mixtures of the solvents.

The concentration of the thermoplastic in the solvent is generally in the range of 1 to 80 wt-%, preferably in the range of 10 to 60 wt-%. In this case, the solution must be set to such a low viscosity, that it is possible to process it in a spray coating process respectively is able to distribute on the particle surface.

Within the scope of the inventive method it is particularly preferable to use the thermoplastics as a dispersion or as a suspension in a solvent.

In the process according to the invention, it is particularly preferable to use the thermoplastics as very finely ground powder, also dissolved or suspended in a solvent. Also partly dissolved thermoplastics can be used.

The relative amounts of radical initiator and of the thermoplastic material can widely alternate and are determined by the desired degree of crosslinking.

Suitable solvents for the solution of the radical initiators are for example: alcohols, halogenated organic solvents, and silanes. Preferred solvents include: methanol, methylene chloride, ethanol, isopropanol, acetone, and organosilanes such as aminosilanes or octylsilanes or other bi- or multi-functional silanes.

In a preferred embodiment of the inventive method as a first layer a coupling agent is applied on the surface of the mineral component. As a following step, the free radical initiator is applied.

Coupling agents, in the context of the present invention, enhance the adhesion of the thermoplastic material on the mineral component by reacting as a reactant to a chemical bonding with the thermoplastic polymer, respectively reacting with the present reactants partners.

Coupling agents are known per se. Examples are silanes, such as H-silanes and siloxanes, such as bifunctional silanes respectively partially condensed silanes or functional siloxanes, it could also be used other organo-metal alkoxides.

For example, the following adhesion agents are: organosilanes, respectively siloxanes (e.g. Ameo®), organo-titanates, organo-zirconates, maleic-anhydride grafted polyethylene, respectively other MSA, calcium-stearate, fatty acids.

In particular, preferred coupling agents are: amino-silanes, vinyl-silanes, acrylic-silanes, methacrylic-silanes, octyl-silanes, epoxy-silanes or amino-groups containing silanes.

For the inventive process, it is preferred to dissolve the coupling agent in a solvent and distribute it among the mineral component and to react it with the surface.

Solvents to dissolve the coupling agent are, for example: methanol, ethanol, propanol, isopropanol, or toluene.

Of course, it is also possible to use mixtures of the solvent or to apply the adhesive agent directly.

The concentration of the coupling agent in the solvent is generally in the range from 1 to 90 wt-%. Prefered is the range of 20 to 70 wt-%.

After reaction of the coupling agent with the surface, the radical initiator is applied, the solvent is removed, then applied to the thermoplastic solution and the solvent removed.

The reaction, and thus the crosslinking of the coated mineral component with the thermoplastic in the context of the present invention, are started by energetic impact in a known manner.

In a preferred embodiment of the present invention, the reaction is initiated by exposure to energy in the form of ionizing radiation.

The energetic impact can be introduced by ionizing radiation or electromagnetic radiation. In the context of the present invention is beta radiation (electron beam) in the range 1 keV to 50 MeV, preferably in the range 1 keV to 10 MeV, particularly preferably in the range of 3 keV to 8 MeV.

Within the scope of the present invention, the dose is from 0.1 to 500 kGy, preferably 1 to 100 kGy, in particular preferably from 2 to 60 kGy.

The irradiation time with the respectively applied energy is adjusted to achieve the desired dose rate in each case.

The irradiation is performed so that the individual particles are moved relative to the radiation source and so the surfaces of the particles are irradiated uniformly. Preferably the free-flowing bulk material is circulated in a reactor.

In a particularly preferred form, the reaction is carried out under reduced pressures.

The inventive method for manufacturing the intermediate products can for example be performed as follows:

1. The free-flowing powder mineral nature is circulated in the reactor.
2. The silane-solvent mixture for example will be sprayed and the particle surface will be coated with the mixture (spray coating).
3. The reaction of the silane-coupling to the mineral surface is performed with thermal assistance.
4. Emergent and residual solvent will be removed.
5. Repeat steps 2 to 4 until the desired nominal cover relative to the specific surface, determined by the BET method, is reached. Typically it is operated on a monomolecular coverage. Other coverages are possible. As an orientation about 0.5-wt % of an aminosilane on a mineral flour with about 8 $m^2/g$ specific surface area were applied.
6. The radical initiators are directly or in solution applied to the particle surfaces (typically spray-coating). For orientation, approximately 0.5-% of the radical initiator were applied.
7. A polymer solution is added and the mixture vigorously mixed, so that the surface of the mineral component is largely covered. It may be useful to use a stronger mixing unit for example a kneader or a mortar mill or a Henschel mixer.
8. The solvent is removed during the stirring by the mixing unit.
9. A vacuum is applied.
10. After removing the solvent fractions, the powder is fed to an irradiation with electron beams.
11. The irradiation is preferably carried out with constant stirring respectively continuous circulation of the free-flowing powder, so that all particle surfaces are uniformly crosslinked. The degree of crosslinking depends on the requirements of the final product and is adjusted by the irradiation energy and the irradiation time. The irradiation can be carried out spatially elsewhere and is independent from the preparation of the coating. For this, commercial systems are available. The radiation dose is about 100 kGy, depending on the desired crosslinking strength.
12. The final intermediate can be used to continue processing to a compound, which then can be used to continue thermoplastic processing as plastic molding (shape forming) of components.

DETAILED DESCRIPTION OF THE INVENTION

Based on the novel intermediates according to the invention a new class of polymeric materials is established in which the mineral component is linked with the polymer.

The present invention therefore also provides new polymeric materials based on thermoplastics and optionally other polymers, mineral components and optionally other admixtures and a radical initiator, which are characterized in that the free radical initiator initiates a reaction, whereupon the surface of the mineral filler is grafted with the thermoplastic polymer chains in a chemical manner.

The components of the materials consist of:
A: mineral components that can have surface hydroxyl groups
B: coupling agent, chemically bonded on the surface of the mineral component
C: a radical initiator or mixtures of different radical initiators, known as photoinitiators, crosslinking boosters, photosensitizers
D: thermoplastic polymers, oligomers or prepolymers or Monomeric (single or mixtures (blends), grafted or ungrafted), which are crosslinked with the surface of the mineral component
E: a thermoplastic matrix polymer which may be identical with D, or even different Examples of each are:
A natural or synthetic materials, with variable external form (for example, fibers, flakes, particles, mixtures thereof), crystalline or amorphous structure, or mixtures thereof. The chemical nature of the mineral phase may be an oxide or silicate nature, just as hydroxides and oxihydrates, and mixed oxides are relevant, as well as pure metals and metal alloys. Examples are: alumina, titanium dioxide, as well as their oxihydrates and hydroxides, calcium oxide. Examples of silicate components are: quartz, cristobalite, talc, kaolin, metakaolin, calcined kaolin, mica (muscovite, phlogopite, vermiculite), diatomite (siliceous earth), siliceous earth, glass beads, hollow glass beads, glass flakes, fused silica/quartz, feldspars, plasorites, silicates, wollastonite, basalt, nepheline, nepheline syenite, perlite (puffed and unexpanded), clays, calcium silicate (CS-phase minerals) and calcium silicate hydrates (CSH-minerals) e.g. tobermorite, xonotlite, glass fibers (E, A, C, D, R, AR), alumosilicates B: metal alkoxides: silanes, titanates, aluminates, zirkonates, (functional)-siloxanes, silicone oils, MSA-grafted polymers, metal soaps, olefins. The metal alkoxides, in particular the silanes are used as bifunctional silanes described in the following form:

$$R_{1-Si-R(2-4)},$$

where upon R1 is a hydrolyzable alkoxy group (for example methoxy- or ethoxy,) or simply hydroxy or chloro or hydrogen. R (2-4) are identical or different and represent organofunctional groups.

R2-R4 may be combinations of the following organofunctional groups: Amino-, for example: Dynasilan® AMEO: 3-for Amino-propyltrietoxysilan e.g.: Dynasilan® DAMO, N-(2-aminoethyl,3-aminopropyl)-trimethoxysilane, epoxy (glycidyl), alkyl-, octyl-, e.g. Dynasilan® OCTMO: trimethoxyoctylsilane, methyl-, alkenyl-, alkoxy-, carboxy-, acid ahydride, aryl-, phenyl-, vinyl-, e.g.: Dynasilan® VTMO: vinyl-trimethoxysilane, acylic-, methacrylic-, e.g.: Dyansilan® MEMO: 3-Methacrylpropyl trimethoxysilane, nitrile-, acrylonitrile-, amido-, photoinitiator-, ureido-, isocyanate-, isocyanurate-, mercapto-, thio-, sulfo-, sulfino-, alkylamino-, dialkyl-, amino-, imino-, nitro-, nitroso-, oxo-, formyl-, chloro-, bromo-, fluoro-, iodo-, keto-groups.

Likewise, partially condensed silanes which are derived from the above structure are used.

C: radical formers are photoinitiators, crosslinking agents or radical initiators and photosensitizers. The photoinitiators are derived from the groups of the benzophenone and its derivatives, the dialkyl and the a-diketones, the acylphosphine of thionathone, amino-coinitiator systems and amino acrylates. These include: the alkylbenzophenones: 2-methyl-benzophenone, 4-methyl-benzophenone, 2,4-dimehtyl-ben-zophenone, 3,4-dimethyl-benzophenone, 4-Isopropyl-ben-zophenon, 4-dodecyl-benzophenone, 2,4,6-trimethyl-benzophenone, 3,3-dimethyl-4-methoxy-benzophenone, 4-phenylbenzophenone the Dialkoxyacetophenonel Ben-ziketale: 4'-bisdimethylamino-benzophenone ("Michlerske-ton"), 2,2'dimethoxy-2-phenylacetophenone ("benzildim-ethylketal"), 1-(4-isopropylphenyl)-2-hydroxy-2methylpropanon-1-one, 2-hydroxy-2-methyl-1-phenylpropane-1-one ("Doracur 1173®"), (1-hydroxycyclohexyl)-phenyl ketone, the halogenbenzo-phenones: chloro-derivatives, 2-chloro-benzophenones, 4-chloro-benzophenones, 2,2'-dichloro-benzophenones, the alkoxy-alkylthioderivate: 2-,3-,4-methoxy-benzophenones, 2-,4-methylthio-benzophenones, 2-ethoxy-benzophenones, 4-propoxy-benzophenone, 4-butoxy-benzophenones, 4-isopropoxy-benzophenones, the carboxylic ester derivatives: 2-methoxycarbonyl-benzophenones, benzophenones-3-methoxycarbonyl, 2- or 4-ethoxycarbonyl-benzophenones, 2- or 4-isopropoxycarbonyl-benzophenones, 4-tert. butoxycarbonyl-benzophenones, 2-butoxycarbonyl-benzophenones, 2,2'-diethoxycarbonyl-benzophenones, the dialkyl-benzileketales/α-diketones: α-aminoalkylphenone, benzoin-ether, benzoin-butylether, benzoin-isopropylic-ether, 10-phenanthrenchinon, 1-benzoyl-cyclohexanonol ("Irgacure 184 (®)"), 2 (dimethylamino) ethyl-acrylate, silylbenzylether, dodecylbenzophenon, benzil, the acyl phosphine oxides: Benzoylphosphinaciddiethylester, 2,4,6 trimethylbenzoylphosphine ("TMDPO"), 2,4,6 trimethyl-benzoylethoxyphenylphosphinoxid ("TMPDO"), bis (2,6 dimethoxybenzoyl)-2,4,4-trimethyl pentylphosphinoxid the thioanthones: 2-/4-Chlorthioxanthon, 2-/4-Isopropylthioxanthon, 2,4-dimethylthioxanthone, the Aminocoinitiatorsysteme: N-methyldiethanolamine, triethanolamine, the amino acrylates: 2-(dimethylamino)ethyl acrylate, or the radical initiators: azo-till(isobutyronitrile) "AIBN" azobis-(4-cyanovaleric acid), dibenzoyl peroxide, dilauroyl peroxide, tert-butyl peroctate, tert.butyl perbenzoate, di-(tert-butyl) peroxide, benzopinacol, 2,2'-di(C1-C8alkyl)benzpinacols, benzoin, Dialkylbenzilketal, dialkoxyacetophenone, acyl-phosphine, 9,1 O-phenanthrenequinone, diacetyl, furil, ani-sil, 4,4'-dichlorobenzyl, 4,4'-dialkoxybenzil, camphorquinone, the photosensitizers: perylene, thioxanthone derivatives, anthracene derivatives, the crosslinking agent selected from the group of acrylates: trimethylolethane-Porpan trimethacrylate ("TRIM"), pentaerythriol triacrylate, pentaerythriol trimethacrylate, Pentaerithriol pentaacrylate, DipentaerythrolPentamethacrylat, Ditri methylol propane tertaacrylat, Ditri methylol propantetramethacrylat, the group of cyanates/cyanurates: triallyl-cyanurate ("TAC"), the group of isocyanates/isocyanurates: Triallyisocyanurat ("TRAIC") trimethallyl ("TMAIC"), other: polymethylene-N-maleimide, tris (4-vinyloxybutyl)-trimellitate, bis(4-vinyloxybutyl)isophthalate.

D: the thermoplastics as polymers, oligomers, prepolymers and monomers

| Polyolefins | |
|---|---|
| CSM | chlorosulfonated polyethylene |
| EEA | ethylene-ethyl acrylate Copolymer |
| EPOM | ethylene-propylene terpolymer |
| EPM | ethylene-propylene elastomer |
| EVA | ethylene-vinyl acetate |
| PE | polyethylene (PE-LO, HO-PE, PE-LLO) |
| PE-C | chlorinated polyethylene |
| PEO | polyethylene oxide |
| PE | polypropylene |
| PA | Polyamide 6, PA 6.6 PA 11, PA 12, etc. Polyamides, cast nylon |
| PVAL | Polyvinyl alcohol |
| Halogenated polymers | |
| CSM | Chlorosulfonated polyethylene |
| ETFE | Ethylene tetrafluoroethylene |
| PEP | Polyfluoroethylenepropylene |
| FPM | Fluorine elastomer |
| PE-C | Chlorinated Polyethylene |
| PVC | Polyvinyl chloride |
| PVOF | Polyvinylidene fluoride |
| PVF | Polyvinyl fluoride |
| Thermoplastic elastomers: | |
| FPM | Fluorine elastomer (thermoplastic) |
| TPE-E | Polyether-ester-copolymers |
| TPE-O | polyolefin-based |
| TPE-S | styrene-based |
| TPE-U | Polyurethane |
| TPE-V | Polyolefin with vulcanized blocks |

E: Are building blocks such as D as thermoplastic polymeric matrix.

The present invention also provides a process for the production of polymeric materials based on thermoplastic and optionally other polymers, surface-modified mineral components and optionally other admixtures and a radical initiator, characterized in that the radical initiator initiates a chemical reaction, after which the surface of the mineral component with the thermoplastic polymer phase are chemically crosslinked.

The energetic impact is effected by ionizing radiation, which acts in the form of electron beams, ultraviolet rays or X-rays on the particles.

The present invention also provides the use of polymeric materials based on thermoplastic and optionally other polymers, mineral components and optionally other admixtures and a radical initiator, wherein the free radical initiator the surface of the mineral component covered and the polymer chains are bonded to the surface of the mineral component, as a thermoplastic semi-finished products in conventional thermoplastic shaping processes (so-called primary shaping, joining and machining).

Examples are the extrusion or injection molding process, or the blow forming, as intake manifolds for vehicles, fuel tanks, vehicles, support plates in electrical and electronic applications, bearings, slippery conveying, eating utensils, pipes, profiles, tubes, plates, cable sheathing, shoe soles, fibers, brushes, housings, gears, screws, seals, fans, rods, fittings and fixtures in the car, especially under the bonnet, coil formers, blow molded, polymer concretes.

The novel polymeric materials according to the invention are characterized, in comparison to materials in which the mineral component is not linked to the polymer, by increased chemical and mechanical properties.

The materials of the invention can, for example, increase the tensile strength by at least 10%, increase the Young's Modulus by at least 10% , by more than 15 K higher heat resistance (HDT) and increased of impact strength by at least 15% notched and unnotched in comparison to comparable known materials.

The invention relates to intermediates (semifinished products) for polymeric composites with coupled mineral and/or polymeric components, the polymeric materials on the basis of the intermediates, a process for their preparation of the intermediates and their use.

In the plastics industry it is a common procedure to improve the characteristic profiles of the known polymers by blending (compounding) of additives such as fillers and additives, or by mixing different types of plastics (blends) in such a way that they meet the specific requirements.

Polymeric composites are usually composed of at least two different phases in which one of the two phases usually is made of an inorganic material. The inorganic phase is surrounded by an organic phase. This organic phase is also referred to as a binder or resin. Composite materials in the context of this invention are dual-compound systems respectively poly-compound systems with an organic phase, which forms the matrix and various other phases, which are not completely miscible during processing with the organic phase. The several phases may be modified with an interphase and this phase boundaries can be made compatible with each other by an coupling agent.

The crosslinking is initiated by a radical former which is deposited within the phases. The radical form of the radical former is built by an energy impact e.g. by ionizing radiation.

From EP 1 340 788 A2 for example, the preparation of a compound is known based on a thermoplastic material. As will be described in this document, are thermoplastics processed, for example polyvinyl chloride, with a crosslinking agent, a stabilizer, chalk as a filler, and an alkylbenzophenone as a radical former to a workable compound. After molding, here extrusion, the polymer is grafted by irradiation with UV light. The fillers are only physically incorporated into the thermoplastic and have only a filling function. After crosslinking, the phase has largely lost its thermoplastic property.

Object of the present invention is the use of anorganic or organic phases (filler/addition-phase), as components of polymer compounds based on synthetic polymers or plastics based on renewable raw materials to increase, for example, the mechanical stability, tensile strength, impact resistance, scratch resistance, elastic modulus, the chemical resistance, etc.

There are found new intermediates for polymeric materials with components which can optionally be surface-modified, a radical former, a matrix polymer and optionally other additives, characterized in that the polymer chains are chemically crosslinked with the surface of a filler (addition-phase).

According to the invention the crosslinking can be done optionally full or in portions over the adhesive agent and/or the free radical former.

In comparison to known polymer compounds in the new compounds, based on the novel intermediates, the filler (addition-phase) is chemically cross-linked with the matrix polymer and not as a "blend" only physically stored. Unlike other crosslinked thermoplastics, the crosslinking is given priority over the inner surface, while the rest of the thermoplastic component is substantially uncrosslinked further present and thus a thermoplastic processing is accessible.

According to the present invention, the new compounds exhibit enhanced chemical and mechanical stability, for example strength or tensile strength or impact strength or the elastic modulus as compared to compounds with embedded filler or with coupling agents, or surface-modified filler components.

With the novel intermediates, a new class of polymeric composite materials is ventured.

The filler can be divided into two groups:

a) inorganic components for polymeric materials in the context of the present invention are, for example silicates containing materials respectively silicate structures containing materials or metal oxides respectively oxide structures containing materials or metal hydroxides respectively hydroxide structures containing materials, carbides or carbon-containing materials such as carbon black, carbon fibers, carbon nanotubes of various structure, fullerenes, or nitrides or nitrogen-containing components, carbonates, sulfates or oxides respectively oxihydrates or mixtures thereof.

b) Organic components are preferably those which have no significant mixing with the polymer matrix during processing or use conditions: thermosets, thermoplastics, elastomers and thermoplastic elastomers (as polymers, oligomers or prepolymers), all are existent in particulate form (e.g. as particles, fibers or platelets), or natural resources such as natural fibers such as hemp, sisal, etc.

Mineral components in the context of the present invention may be:

Silicates: natural and synthetic silicates, fumed and precipitated silicas, so-called island-silicates, chain silicates, band-silicates, network layer silicates or alumosilicates, minerals of the quartz group (quartz, fused silica, quartz glass, cristobalite), zeolites, feldspars, calcium silicate-phase or Ca-silicate-hydrat-phase minerals (CSH) (e.g. Tobermorite or Xonotlite) or Metal oxides: natural or synthetic metal oxides such as alumina, silica, magnesium oxide, calcium oxide, titanium dioxide, iron oxides, zinc oxide. This is only an indicative list of possible components.

In the particular preferred in the context of the present invention the filler component consists of organic with the matrix polymer immiscible or inorganic components which have on the surfaces hydroxyl groups, such as hydroxy-silicates and/or alumosilicate and/or siliconoxide and/or aluminiumoxide materials or titanium dioxides. Likewise, carbon, or glass, or rock wool fibers are also used as carbon nanotubes.

For example, the following mineral materials are: mica, talc, wollastonite, asbestos, quartz, fused silica, silica, micro silica, kaolin, calcined kaolin, xonotlite, tobermorite, nepheline syenite, aluminum oxide, and titanium dioxide.

In the context of the present invention, the filler component can be existent in granular form. In a preferred embodiment of the present invention, the filler component is existent in finely divided form, isolated, or as a dispersion or suspension.

It is preferable that the filler has a particle size distribution of less than 4 mm is present.

In particular, is preferred here that the filler has a particle size distribution of 5 nm to 250 microns.

The novel intermediates are on the surface of the filler component largely in a monomolecular layer of the matrix polymer, or at least covered in submonolayer.

The radical former is thereby incorporated into the interfaces of the phases, so that virtually a multi-layered structure is constructed.

A multi-layer cover is of course also possible.

In the event that is desired in the context of the invention that the mineral component is not associated entirely with the matrix polymer, of course, the cover can also be existent only partially (submonolayer).

Radical former in the context of the present invention are known per se.

Radical former in the context of the present invention can be: photoinitiators, photosensitizers or crosslinking agent. It can also be functional silanes respectively siloxanes with functional groups which decompose in radicals under energetic action and/or initiate a crosslinking reaction.

Preferred radical former in the context of the present invention can be: photoinitiators:

Benzoin ethers, benzil, benzyl-ketals, such as alpha-splitter, alpha-aminoalkylphenone alpha-alpha-diethoxyacetophenone, alpha-hydroxyalkyl-phenone, aromatic ketone- Co-initiator systems: benzophenones and substituted benzophenones, Mischlers-Ketone, Sensitizers: aromatic halo-ketones: phenacylchloride, desylchloride or 4-chlormethylbenzophenone. Cross-linking agents: trimethylole propane trimethacrylate (TRIM) or triallyl cyanurate (TAC), Triallylisocyanurate (TAIC).

In the context of the present invention matrix polymers are attached to the surface with coupling agents modified filler components and then cross-linked with it.

Matrix polymers in the context of the present invention are (un-)/saturated, branched or unbranched, grafted or ungrafted thermoplastics and thermoplastic elastomers. They can be provided by addition reactions or by grafting with reactive groups.

For example, the following matrix polymers are termed.: polyethylene, polypropylene or mixtures of polyethylenes and polypropylenes (e.g. grafted and ungrafted), polyamide, polyurethane, polyvinyle chloride, polycarbonate, PMMA, polyaryletherketones (e.g. PEEK), polyoxymethylene, polystyrenes, polyimides, thermoplastic elastomers and natural polymers. This is only a selection of generally usable thermoplastics.

In the context of the present invention it is possible that the inventive intermediates contain additional known admixtures.

As admixtures (additives) are termed for example: flame retardants such as aluminumtrihydroxide (ATH) or magnesium hydroxide (MDH), stabilizers such as metal soaps and organo-tin compounds. Plasticizers such as substituted phthalates (for example dibutyl-phthalate), lubricants such as paraffins or UV stabilizing agents or fillers such as, for example marble flour or silicates.

Coupling agents in the context of the present invention act as a linking or grafting spot (point) between the mineral surface and the polymer.

Coupling agents are known per se. Examples may be silanes, such as H-silanes and siloxanes, such as bifunctional silanes respectively partially condensed silanes or siloxanes functional, functional polysiloxanes, silicone oils called, it can also be used other organo-metal alcoholates or maleic anhydride (MA) grafted polymeric metal soaps, low molecular weight olefins, fats, waxes or oils.

For example, the following coupling agents are: organosilanes (eg. AMEO®) respectively organo-siloxanes, organo-titanates, organo-zirconates, maleic anhydride grafted polyethylene or other maleic anhydride grafted polymers, calcium stearate, fatty acids.

In particular, are preferred as coupling agents: amino silanes or amino groups containing bifunctional-silanes, vinyl-silanes, acrylic-silanes, methacrylic-silanes, octyl-silanes or epoxy-silanes.

It has been found also in a process for preparing the intermediates for polymeric materials with components, which is characterized in that the radical initiator concentrated at the surface of the component is existent, the matrix polymer is added and the crosslinking is initiated by energetic impact.

The radical initiator can be mixed in solid, finely divided, liquid state or in solution with the filler and distributed on the surface.

It is generally preferred to distribute the radical initiator uniformly on the filler component.

For the inventive method, it is preferred to dissolve the radical initiator in a solvent and distribute it on the filler component.

Suitable solvents for the solution of the radical initiators are for example: alcohols, halogenated organic solvents, silanes, and alkanes and alkene and/or Ionic liquids.

Preferred solvents are for example: methanol, methylene chloride, ethanol, isopropanol, acetone, organosilanes such as aminosilanes or octylsilanes or other bi- or multi-functional silanes and Ionic Liquids.

Of course it is also possible to use mixtures of the solvents.

A preferred embodiment of the inventive method is characterized in that the filler and the radical initiator is used in a mass ratio less than 5%, preferably in a ratio of less than 2% by weight, based on the mass of the filler component.

In a preferred embodiment of the method the filler component is present in finely divided form.

It is preferable that the filler has a particle size of less than 4 mm.

In particular, it is preferred that the filler has a particle size of 5 nm to 250 microns.

The thermoplastic and the interphase can be given to the filler component with the radical initiator as a dissolved polymer matrix, as an oligomer or prepolymer, as a monomer, gaseous or in fine-particle form or in solution or as low molecular weight polymer. Of course it is also possible to use mixtures of different polymers.

In a preferred embodiment of the present invention, the thermoplastic is used in solution.

For the present method, it is preferable to dissolve the thermoplastic material in a solvent. Then the modified (with the coupling agent surface-component, which is occupied by the radical initiator) filler surface is coated with the plastic solution.

Suitable solvents for the solution of thermoplastics are for example: dichloromethane, butanone, tetrahydrofuran, chloroform, benzene. m-cresol, toluene, trichlorethylene, cyclohexanone, methyl-ethyl-ketone, acetone, dimethylformamide, ethylacetate, methanol, ethanol or cyclohexane. The choice of solvent depends on the matrix to be dissolved polymer and the filler component.

Preferred solvent for polyamide are for example: toluene, m-cresol, cyclohexanone, methyl-ethyl-ketone.

In particular, toluene and m-cresol is preferred as a solvent for polyamide.

Of course it is also possible to use mixtures of the solvents.

The concentration of the thermoplastic in the solvent is generally in the range from 1% to 80% by mass, preferably in the range of 10 to 60 M-%. In this case, the solution should be set to such a low viscosity, that it is possible to process it in a spray coating process respectively is able to distribute on the filler surface.

Within the scope of the inventive process it is particularly preferable to use the thermoplastics as dispersion or as a suspension in a solvent.

In the process according to the invention it is particularly preferably to use the thermoplastics as very finely ground powder, also dissolved or suspended in a solvent. Partly dissolved thermoplastics can also be used.

The relative amounts of radical initiator and of the thermoplastic material can widely alternate and are determined by the desired degree of crosslinking.

In a preferred embodiment of the inventive method, a first layer a coupling agent is applied on the surface of the mineral component and as a following step the radical initiator is applied.

Coupling agents in the context of the present invention increase the adhesion of the polymer matrix to the filler component by using a surface active substance which increases the wetting with the matrix polymer.

Bonding agents are known per se. Examples which may be silanes, such as H-silanes and siloxanes, such as bifunctional silanes and partially condensed as silanes or siloxanes known as functional, it could also be used other organometal alkoxides.

For example, the following adhesive agents are: organosilanes, respectively siloxanes (eg. Ameo®), organo-titanates, organo-zirconates, maleic anhydride grafted polyethylene or other maleic anhydride grafted polymers, Ca-stearate, fatty acids.

In particular preferred adhesion agents are: aminosilanes, vinylsilanes, acrylicsilanes, methacrylicsilanes, octylsilanes, epoxysilanes or amino-containing-silanes.

For the inventive method, it is preferred to dissolve the coupling agent in a solvent and to distribute it on the filler component and in the case of a mineral filler to react with the surface.

Examples for a solvent to dissolve the adhesive agents are:

Methanol, ethanol, propanol, isopropanol or toluene.

Of course, it is also possible to use mixtures of the solvent or to apply the adhesive agent directly.

The concentration of the adhesion agent in the solvent is generally in the range from 1% to 90 weight-% preferably in the range of 20 to 70 weight-%.

After an effect and optionally a reaction of the coupling agent with the surface the radical initiator is applied, the solvent is removed, then the thermoplastic solution is applied and the solvent removed. In the case of applying an interphase, the procedure is applied successively.

The reaction, and thus the cross-linking of the filler component with the thermoplastic in the context of the present invention, is started by energetic impact in a known manner.

In a preferred embodiment of the present invention, the reaction is initiated by an impact of energy in the form of ionizing radiation.

The energetic impact can be introduced by ionizing radiation or electromagnetic radiation. In the context of the present invention, beta radiation (electron beam) is applied in the range 1 keV to 50 MeV, preferably in the range 1 keV to 10 MeV, particularly preferable in the range of 3 keV to 8 MeV.

The dose is within the scope of the present invention from 0.1 to 500 kGy, preferably 1 to 100 kGy, in particular preferably from 2 to 60 kGy.

The irradiation time with the respectively applied energy is adjusted to achieve the desired dose rate.

The irradiation is performed in a way that the individual particles are moved relative to the radiation source and so the surfaces of the particles are irradiated uniformly. It is preferable here that the free-flowing bulk material is circulated in a reactor.

In a particularly preferred form, the reaction is carried out under reduced pressures.

The inventive method for manufacturing the intermediate products can for example be performed as follows:

1. The free-flowing powder, e.g. filler, is circulated in the reactor.
2. The silane-solvent mixture for example will be sprayed and the particle surface will be coated with the mixture (spray coating).
3. The reaction of the silane-coupling to the mineral surface is performed with thermal assistance.
4. Emergent and residual solvent will be removed.
5. Repeat steps 2 to 4 until the desired nominal cover relative to the specific surface, determined by the BET method, is reached. Typically it is operated on a monomolecular coverage. Other coverages are possible. As an orientation about 0.5-wt % of an aminosilane on mineral flour with about 8 $m^2/g$ specific surface area were applied.
6. The radical initiators are directly or in solution applied to the particle surfaces (typically spray-coating). For orientation, approximately 0.5-% of the radical initiator is applied.
7. A polymer solution is added and the mixture vigorously mixed, so that the surface of the mineral component is largely covered. It may be useful to use a stronger mixing unit for example a kneader or a mortar mill or a Henschel mixer.
8. The solvent is removed during the stirring of the mixing unit.
9. A vacuum is applied.
10. After removing the solvent, the powder is fed to the irradiation with electron beams.

11. The irradiation is preferably carried out with constant stirring respectively continuous circulation of the free-flowing powder, so that all particle surfaces are uniformly crosslinked. The degree of crosslinking depends on the requirements of the final product and is adjusted by the irradiation energy and the irradiation time. The irradiation can be carried out spatially elsewhere and is independent from the preparation of the coating. For this, commercial systems are available. The radiation dose is about 100 kGy, depending on the desired crosslinking strength.
12. The final intermediate can be used to continue processing to a compound, which then can be used to continue thermoplastic processing and then shape forming of components.

Based on the novel intermediates according to the invention a new class of polymeric materials is established in which the filler component is linked with the polymer.

The present invention therefore also provides new polymeric materials based on thermoplastic and optionally other polymers, mineral components and optionally other admixtures and a radical initiator, which are characterized in that the free radical initiator initiates a reaction, whereupon the surface of the mineral constituent with the thermoplastic polymer chains are chemically crosslinked.

The components of the materials may consist of:
Components which are compare to the matrix polymer not or even reduced mixable during processing or using temperature for example solid during processing and using. But not limited thereto.
one on the surface of the filler component applied coupling agent.
a radical former or mixtures of different, known as photoinitiators, crosslinking boosters, photosensitizers.
thermoplastic polymers, oligomers or prepolymers or monomers (individual or mixtures (blends)), which are crosslinked with the surface of the mineral component, grafted or ungrafted.
a on the modified surface of the filler applied adhesive agent, optionally with a radical former.
a thermoplastic matrix polymer.

Examples of the different components are: natural or synthetic materials, with variable external form (for example, fibers, flakes, particles, mixtures thereof), crystalline or amorphous structure, or mixtures thereof. The chemical nature of the phase F can be organic in nature. These include thermosets, thermoplastics, elastomers and thermoplastic elastomers or polymers based on renewable raw materials. Similarly, the chemical nature of the filler phase can be inorganic in nature: This included in particular metals (pure and alloys) and their metal oxides, metal hydroxides and oxi-hydrates. Similarly, hydroxides and oxihydrates, and mixed oxides are relevant. Examples are: alumina, titanium dioxide, as well as their oxi-hydrate and hydroxides, calcium oxide. Likewise, the filler phase can consist of mineral components, such as silicates, carbonates, sulfates, silicate-hydrates, alumosilicates, etc. Examples of silicate components are: quartz, cristobalite, talc, kaolin, metakaolin, calcined kaolin, mica (muscovite, phlogopite, vermiculite), diatomite (siliceous earth), glass beads, hollow glass beads, glass flakes, fused silica/quartz, feldspars, plasorite, silicates, wollastonite, basalt, nepheline, nepheline syenite, perlite (puffed and unexpanded), clays, calciumsilikate (CS-phase minerals) and calcium silicate hydrates (CSH phases-minerals), for example Tobemorit, Xonotlith, glass fibers (E, A, C, D, R, AR), alumosilicates. These also include mixtures of the components.

Metal alkoxides: silanes, titanates, aluminates, zirconates, (functional)-siloxanes, silicone-oils, maleic anhydrite-grafted polymers, metal soaps, and olefins. The metal alkoxides, in particular the silanes as bifunctional silanes are described in the shape, and mixtures thereof.

$$R_{1-Si-R(2-4)},$$

in which R1 is a hydrolyzable alkoxy-group (for example methoxy or ethoxy), or
Hydroxy- or chloro- or hydrogen. $R_{(2-4)}$ are organofunctional groups.
$R_2$-$R_4$ may be combinations of:
Amino-groups, such as: Dynasilan® AMEO: 3-aminopropyltrietoxysilan for example: Dynasilan® DAMO, N-(2-aminoethyl,3-aminopropyl)-trimethoxysilane, epoxy-(glycidyl-), alkyl-, octyl-, e.g.: Dynasilan® OCTMO: trimethoxyoctylsilane, methyl-, alkenyl-, alkoxy-, carboxy-, acid-, anhydride-, aryl-, phenyl-, vinyl-, for example: Dynasilan® VTMO: vinyltrimethoxysilane, acyl-, methacrylic-, for example: Dyansilan® MEMO: 3-methacrylpropyl-trimethoxysilane, nitrile-, acrylonitrile-, amido-, photoinitiator-, ureido-, isocyanate-, isocyanurate-, sulfonido-, mercapto-, thio-, sulfo-, sulfino-, alkylamino-, dialkyl-amino-, imino-, nitro-, nitroso-, oxo-, formyl-, chloro-, bromo-, fluoro-, iodo-, keto-groups.

Likewise, partially condensed silanes which are derived from the above structure can be used or mixtures thereof.

Radical initiators may be photoinitiators, crosslinking agents or radical initiators and photosensitizers.

The photoinitiators are derived from the groups of the benzophenone and its derivatives, the dialkyl- and the alpha-diketones, the acylphosphine of thionathone, amino-coinitiator systems and amino acrylates. These include the alkylbenzophenones: 2-methyl-benzophenone, 4-methyl-benzophenone, 2,4-dimethyl benzophenone, 3,4-dimethyl-benzophenone, 4-isopropyl-benzophenone, 4-dodecyl benzophenone, 2,4,6 -trimethyl-benzophenone, 3,3-dimethyl-4-methoxybenzophenone, 4-phenyl-benzophenone;

the dialkoxyacetophenone, benzilketale: 4'-bisdimethyl-amino-benzophenone ("Michlers-Ketone"), 2,2'dimethoxy-2-phenylacetophenone ("benzildimethylketal"), 1-(4-isopropylphenyl)-2-hydroxy-2-methylpropanon-1-one, 2-hydroxy-2-methyl-1phenylpropane-1-one ("Doracur 1173®"), (1-hydroxycyclohexyl)-phenyl-ketone, the halogen-benzophenone: chloro-derivatives, 2-chloro-benzophenone, 4-chloro-benzophenone, 2,2'-dichloro-benzophenone;

the alkoxy-alkylthioderivates: 2-,3-,4-methoxy-benzophenone, 2-,4-methylthio-benzophenone, 2-ethoxy-benzophenones, 4-propoxy-benzophenones, 4-butoxy-benzophenone, 4-isopropoxy-benzophenones,the carboxylic-ester derivatives: 2-methoxycarbonyl-benzophenones, 3-methoxycarbonyl-benzophenone, 2- or 4-ethoxycarbonyl-benzophenones, 2 or 4-isopropoxycarbonyl-benzophenone, 4-tert-butoxycarbonyl-benzophenone, 2-butoxycarbonyl-benzophenone, 2,2'-diethoxycarbonyl-benzophenone;

the dialkylbenzileketales alpha-diketones: α-aminoalkyl-phenone, benzoin-ether, benzoin-butylether, benzoin-isopropylic-ether, 10-phenanthrenchinon, 1-benzoyl-cyclo-hexanonol ("Irgacure 184 (®)"), 2-dimethylamino-ethyl-acrylate, silylbenzylether, dodecylbenzophen, benzil, the acylphosphineoxides: benzoylphosphinaciddiethylester, 2,4,6 trimethylbenzoylphosphine ("TMDPO"), 2,4,6 trim-ethylbenzoylethoxyphenyl-phosphinoxide ("TMPDO"), bis (2,6 dimethoxybenzoyl)-2,4,4-trimethyl pentylphosphinoxide, the thioanthones: 2-/4-chlorothioxanthon, 2-/4-isopropylthioxanthon, 2,4-dimethylthioxanthone;

the amino-coinitiator systems: N-methyldiethanolamine, triethanolamine, the amino acrylates: 2-(dimethylamino)ethyl acrylate, or the radical initiators: azo-bis(isobutyronitrile) "AIBN", azo-bis-(4-cyanovaleric-acid), dibenzoyl-peroxide, dilauroyl-peroxide, tert-butyl-peroctate, tert.butyl-perbenzoate, di-(tert-butyl)-peroxide, benzopinacol, 2,2'-di (C1-C8alkyl)benzpinacols, benzoin, dialkylbenzilketal, dialkoxyacetophenone, acylphosphine, 9,10-phenanthrene-quinone, diacetyl, furil, anisil, 4,4'-dichlorobenzyl, 4,4'-dialkoxybenzyl, camphorquinone;

the photosensitizers: perylene, thioxanthone derivatives, anthracene derivatives, the crosslinking agent selected from the group of acrylates: trimethylo-propane trimethacrylate ("TRIM"), pentaerythriol-triacrylate, pentaerythriol-trimethacrylate, pentaerithriol-pentaacrylate, dipentaerythrol-pentamethacrylat, ditri-methylol-propane-tertaacrylat, ditri-methylol-propantetramethacrylat;

the group of cyanates/cyanurates: triallyl-cyanurate ("TAC");

the group of isocyanates/isocyanurates: triallyisocyanurate ("TRAIC") trimethallyl-isocyanurate ("TMAIC"); and others: polymethylene-N-maleimide, tris(4-vinyloxybutyl)-trimellitate, bis(4-vinyloxybutyl)-isophthalate.

This includes metal alkoxides (eg silanes) as containing as an organofunctional group in the above groups.

Thermoplastic polymers may be also oligomers, prepolymers and monomers, such as:

| Polyolefins | |
|---|---|
| CSM | chlorosulfonated polyethylene |
| SEA | ethylene-ethyl acrylate copolymer |
| EPOM | ethylene-propylene terpolymer |
| EPM | ethylene-propylene elastomer |
| EVA | ethylene-vinyl acetate |
| PE | oolyethylene (PE-LO, HO-PE, PE-LLO) |
| PE-C | chlorinated Polyethylene |
| PEO | polyethylene oxide |
| PE | polypropylene |
| PA | Polyamide 6, PA 6.6 PA 11, PA 12, etc. Polyamides, cast nylon |
| PVAL | Polyvinyl alcohol |
| Halogenated polymers | |
| CSM | chlorosulfonated polyethylene |
| ETFE | ethylene tetrafluoroethylene |
| PEP | polyfluoroethylenepropylene |
| FPM | fluoroelastomer |
| PE-C | chlorinated polyethylene |
| PVC | polyvinyl chloride |
| PVOF | polyvinylidenefluoride |
| PVF | polyvinylfluoride |
| Thermoplastic elastomers: | |
| FPM | fluorine elastomer (thermoplastic) |
| TPE-E | polyether-ester-copolymers |
| TPE-O | polyolefin-based |
| TPE-S | styrene-based |
| TPE-U | polyurethane |
| TPE-V | polyolefin with vulcanized blocks | which additionally can all be provided with functional groups or mixtures thereof.

The present invention also provides a process for the preparation of polymeric materials based on thermoplastic and optionally other polymers, surface-modified mineral components and optionally other admixtures and a radical initiator, characterized in that the radical initiator initiates a chemical reaction, after which the surface of the filler of the thermoplastic polymer phase is chemically crosslinked.

The energetic impact is effected by ionizing radiation which acts in the form of electron beams, ultraviolet rays or X-rays on the systems.

The present invention also provides the use of polymeric materials based on thermoplastic and optionally other polymers, mineral components and optionally other admixtures and a radical initiator, wherein the free radical initiator covered the surface of the filler component and polymer chains are bonded to the surface of the mineral component, as a thermoplastic semi-finished product in conventional thermoplastic shaping processes (so-called primary shaping, molding, joining and machining). Examples are extrusion or injection molding process, or the blow, as intake manifolds for vehicles, fuel tanks, vehicles, support plates in electrical and electronic applications, bearings, slippery conveying, eating utensils; pipes, profiles, tubes, plates, cable sheathing, shoe soles, fibers, bristles, housing, gears, screws, seals, fans, rods, fittings and fixtures in the car, especially under the bonnet, coil formers, blow molded, and polymer concretes.

The novel polymeric materials according to the invention are characterized in comparison to materials in which the mineral component is not linked to the polymer, by increased chemical and mechanical properties.

They have, for example, at least 10% higher tensile strength, increased by at least 10% Young's modulus, a more than 15 K higher heat resistance and increased impact strength by at least 15% notched and unnotched.

What is claimed is:

1. A method for producing intermediates for polymeric materials with filler components of organic or inorganic components comprising the steps of:
   distributing a free radical initiator on a surface of the filler component, adding a thermoplastic polymer and crosslinking is initiated by energetic impact via ionizing radiation to result in cross-linked polymer-chains to the surface of the filler component.

2. The method according to claim 1, wherein the free radical initiator in solution or as finely divided suspension or dispersion is distributed on the filler component and/or dissolved in a solvent and distributed on the filler component.

3. The method of claim 1, wherein the filler component is present in a finely divided state.

4. The method according to claim 1, wherein the filler components are surface-modified, and are mineral filler components, wherein the mineral filler components are present with an average grain size in the range of 5 nm to 250 microns.

5. The method according to claim 1, wherein the thermoplastic polymer is added in solution to cover the filler component with the free radical initiator.

6. The method according to claim 1, wherein the filler components are surface-modified and/or unmodified filler components, wherein the thermoplastic polymer is used as a solution or is used as a suspension or is used as a dispersion or in the form of a finely divided powder covering the surface of the filler component.

7. The method according to claim 1, wherein the filler components are optionally surface-modified mineral/inorganic filler, wherein a coupling agent and the free radical initiator are used in a molar ratio 100:1 to 1:100.

8. The method according to claim 1, wherein the filler components are surface-modified mineral filler components, wherein the mineral filler component is covered with a coupling agent that is a bifunctional silane or a functional polysiloxane, and then the free radical initiator is distributed on this surface.

9. The method of claim 1, wherein the filler component is optionally surface-modified mineral filler component, and is covered with the free radical initiator, and thermoplastic polymer, wherein the coupling is initiated with ionizing radiation or with electron beams or with a mixture of electron beams, X-rays and ultraviolet radiation.

10. The method of claim 1, wherein the filler component is covered with free radical initiator and thermoplastic polymer, wherein the coupling is initiated with ionizing radiation like electron beams, UV radiation or X-rays.

11. The method of claim 1, wherein the thermoplastic polymer is oligomeric, prepolymeric or macromolecular.

* * * * *